Sept. 3, 1963                    B. C. MORETZ                    3,102,299
           APPARATUS FOR MAKING SILICONE IMPREGNATED SHIELDED LEAD
Original Filed Dec. 7, 1956                              5 Sheets-Sheet 4

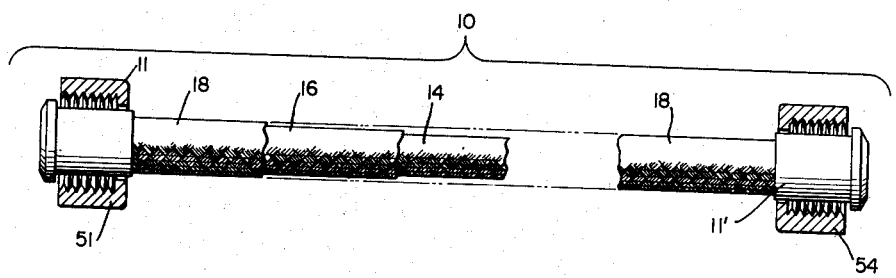
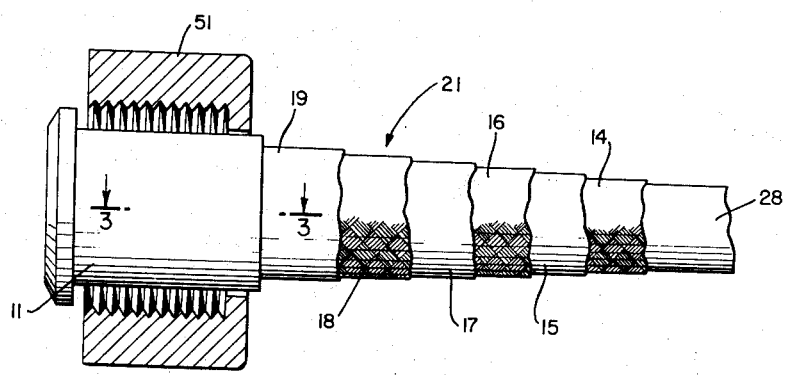
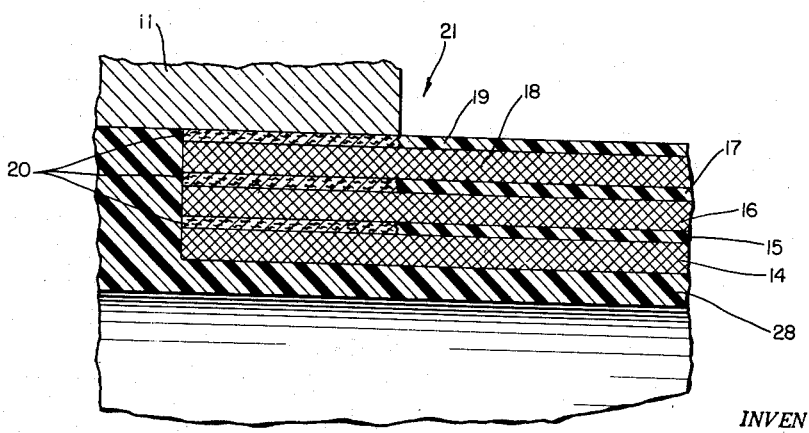

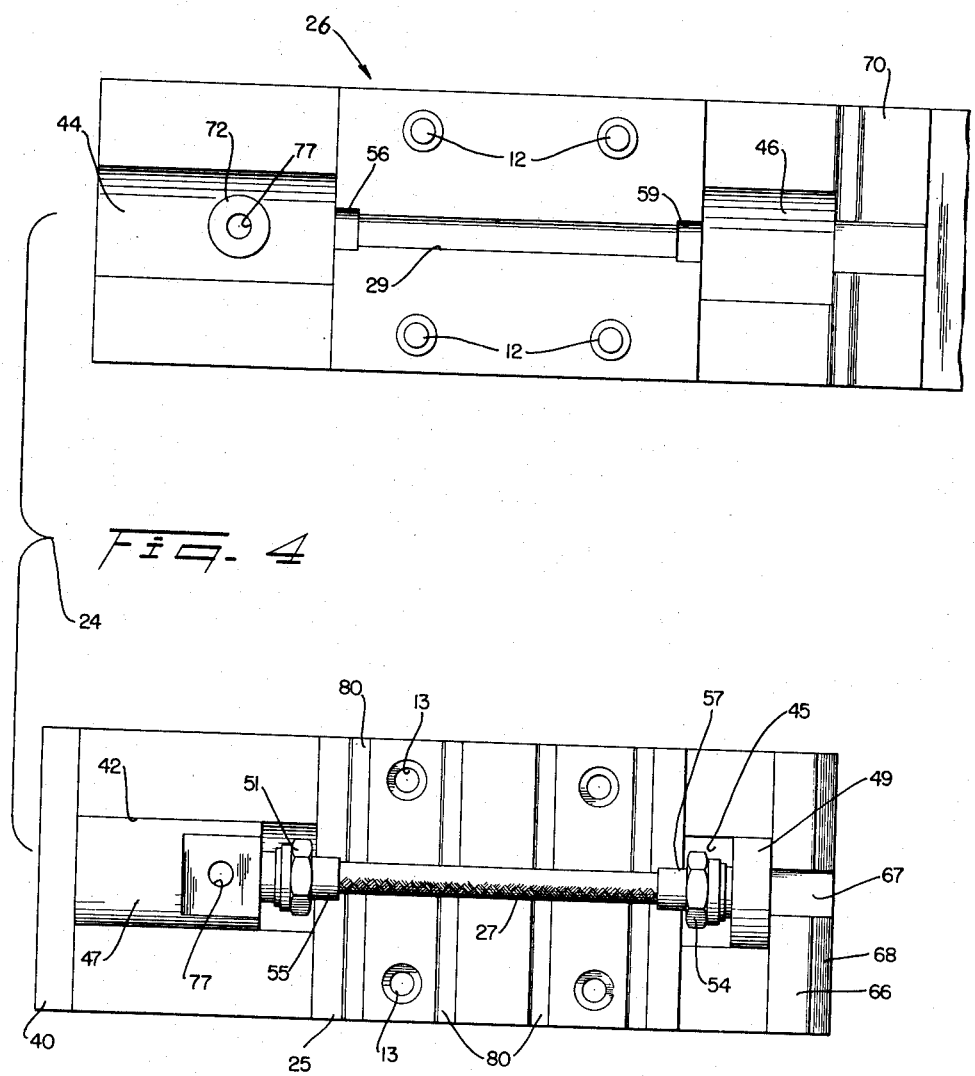

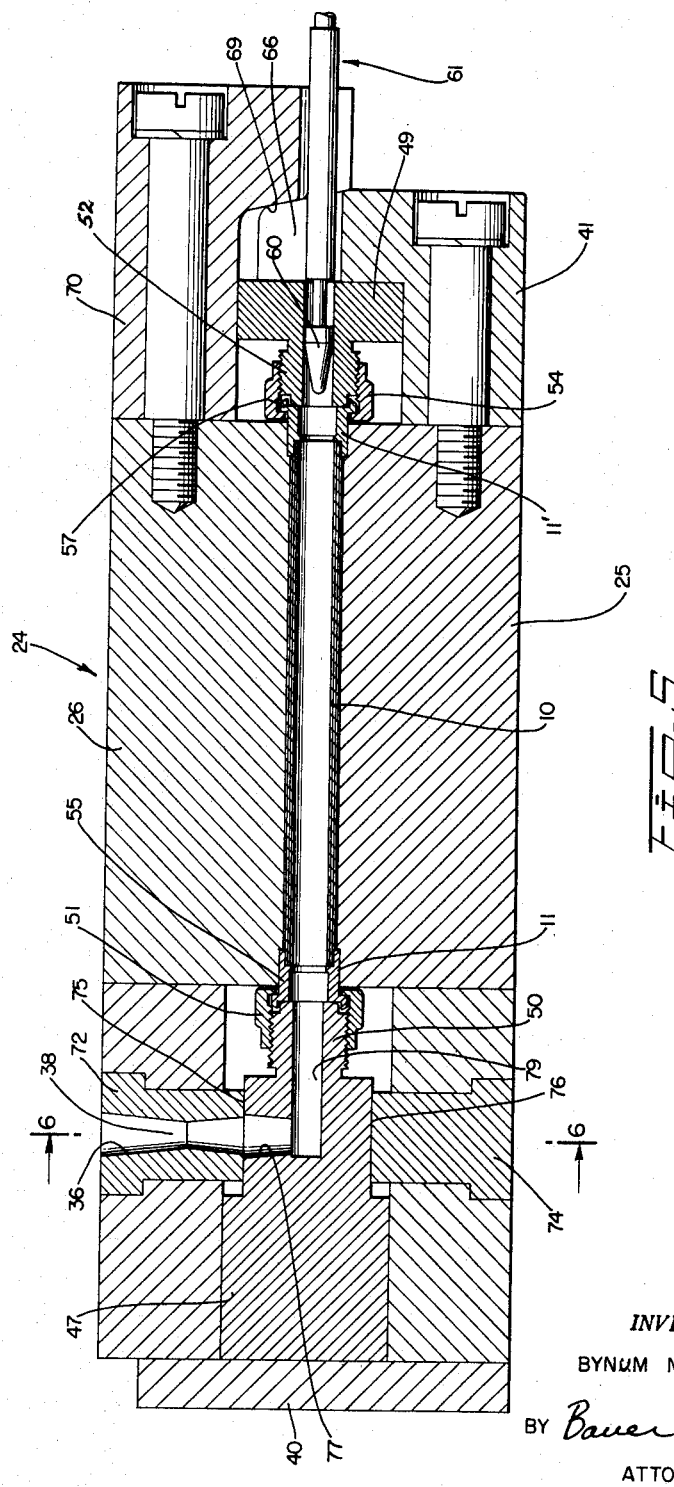

INVENTOR.
BYNUM MORETZ
BY Bauer + Seymour
ATTORNEYS

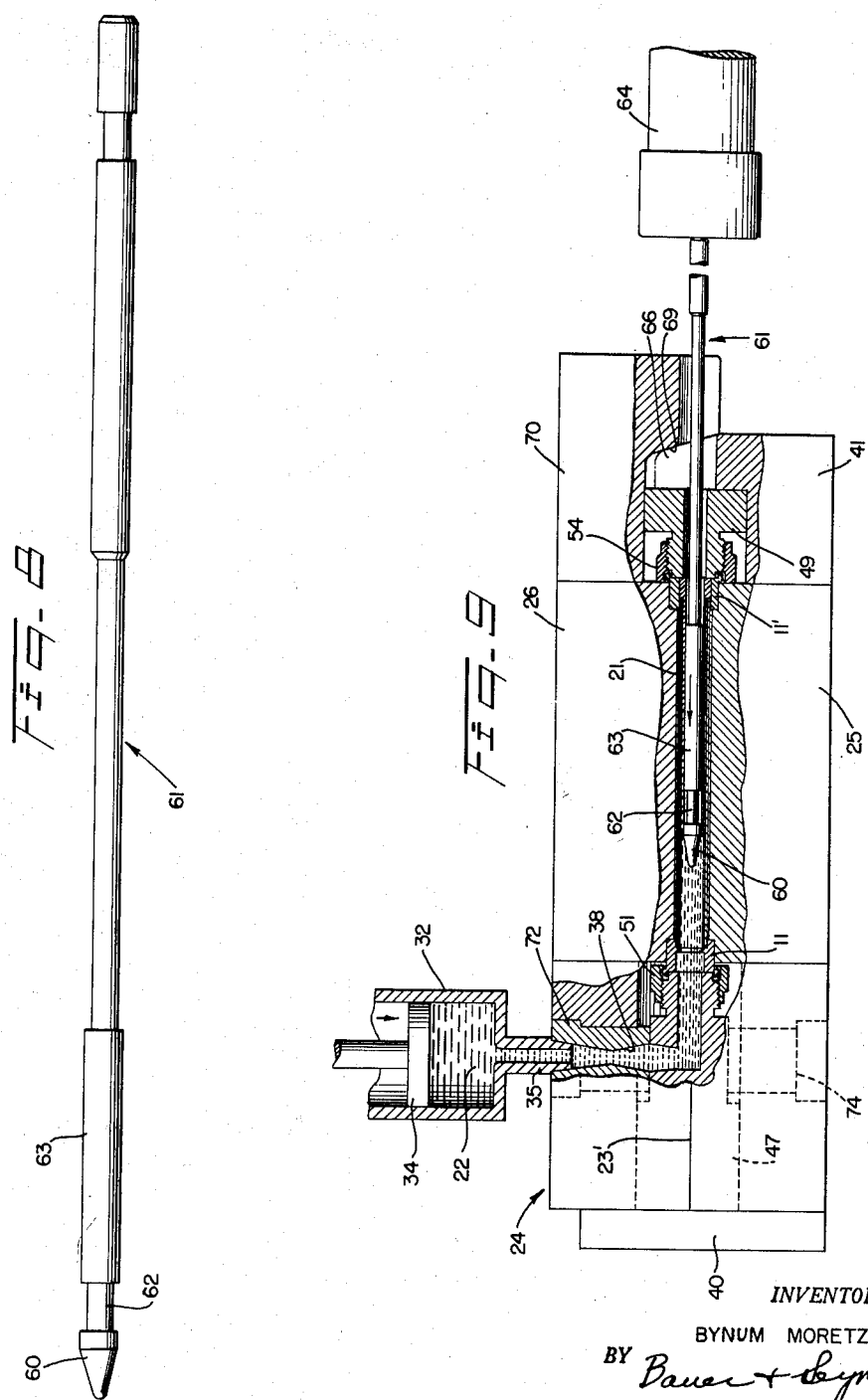

United States Patent Office

3,102,299
Patented Sept. 3, 1963

3,102,299
APPARATUS FOR MAKING SILICONE
IMPREGNATED SHIELDED LEAD
Bynum Clay Moretz, Bainbridge, N.Y., assignor to The
Bendix Corporation, a corporation of Delaware
Original application Dec. 7, 1956, Ser. No. 627,045, now
Patent No. 2,981,983, dated May 2, 1961. Divided
and this application Aug. 29, 1960, Ser. No. 52,603
9 Claims. (Cl. 18—5)

This invention relates to the treatment of a porous-walled flexible tube or conduit, such as a flexible metal radio-shielding conduit and the like. More particularly, the invention relates to an apparatus for impregnating the walls of such conduit with flexible non-porous materials.

This application is a division of application Serial No. 627,045, filed December 7, 1956, now Patent No. 2,981,-983.

One of the objects of the present invention is to provide a novel apparatus for impregnating porous-walled tubes.

Another object of the invention is to provide an improved apparatus for impregnating tubes of the indicated character in a faster, more uniform manner.

A further object is to provide an improved apparatus for impregnating porous-walled tubes whereby the tube is provided with a uniform smooth inner coating layer, and the necessity for draining the impregnating compound from the impregnated tube is eliminated.

Yet another object of the invention is to provide an improved apparatus for making an improved impregnated flexible conduit by subjecting the impregnating compound in the tube sidewalls to pressure in two stages, and wherein the sidewalls of the tube are more uniformly impregnated and are free from voids, air bubbles, etc.

A still further object is to provide an improved simplified mold in which the conduit is positioned during the described impregnating operation, said mold including novel gating means, novel means for sealing the ends of the conduit to the walls of the mold cavity, and novel means for mounting a conduit bore-defining mandrel for reciprocation in an impregnated conduit.

The above and further objects and novel features of the invention will more fully appear from the following detailed description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views, FIG. 1 is a view in elevation of a typical flexible conduit which may be treated in accordance with the invention, a central portion of the conduit being broken away, the tubes making up the portion of the conduit wall shown at the left being progressively peeled or cut away;

FIG. 2 is a fragmentary view in elevation, generally corresponding to the left hand portion of FIG. 1, of the conduit after an impregnating treatment in accordance with the invention;

FIG. 3 is an enlarged fragmentary view in radial section through the conduit of FIG. 2, the section being taken along the line 3—3 of FIG. 2;

FIG. 4 is a view in plan of the upper and lower parts of an embodiment of mold useful in carrying out the method of the invention, the upper mold part having been lifted from the lower mold part and turned upside down.

FIG. 5 is a view in vertical longitudinal axial section through the mold of FIG. 4 with the conduit being treated shown as positioned therein;

FIG. 8 is an elevation of the mandrel employed in the conduit-impregnating mold; and FIG. 9 is a somewhat schematic view, partially in side elevation and partially in section, of the impregnated conduit and mold end block assembly during the final, mandrel advancing step.

Figure 6:
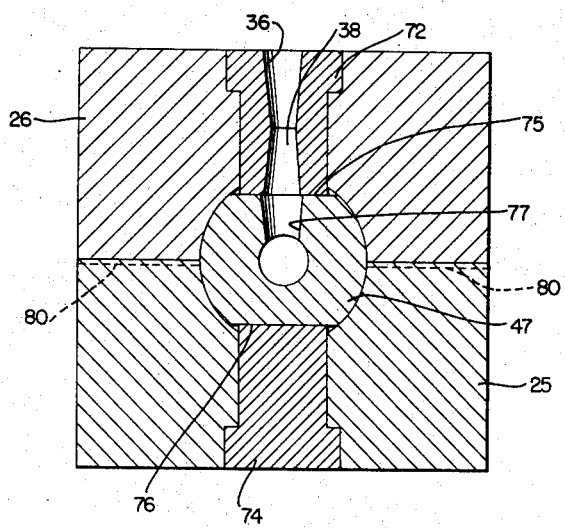
FIG. 6 is a fragmentary view in vertical section through the mold and a conduit positioned therein, the section being taken generally along the line 6—6 of FIG. 5.

The embodiment of the conduit illustrated in the accompanying drawings, by way of example, is in the form of a composite flexible metal-walled tube which is useful, for example, as a shield for conductors in the ignition system of an internal combustion engine. When the metal wall if the conduit is properly grounded, it forms an effective shield against the radiation of electromagnetic vibrations, set up by the ignition system, which would otherwise interfere with radio communication. When the conduit is employed with an airplane engine it is, of course, subjected to extremely adverse conditions including vibration by wind current and engine operation, exposure to extremes of high and low temperatures, electrical corona, grease, oil and moisture, as well as wide variations in altitude.

The novel conduit construction of the invention will be more readily understood by a comparison of FIG. 1 wherein the assembled but unimpregnated conduit is designated 10, and FIG. 2, wherein the impregnated portion of the conduit shown is designated 21. As indicated in FIG. 1, the conduit comprises a plurality of superposed telescoped tubes or sleeves made of braided wire, three being shown in the illustrative embodiment. The innermost of such tubes is designated 14, the intermediate wire tube being designated 16, and the outermost wire tube being designated 18. The wire strands forming such tubes may be braided in a normal manner to make up the tubes, and may be constituted in various forms known to the art. In a preferred embodiment each strand is made up of about eight small wires laid side by side to simulate a flat strip. The tubes may be braided separately and inserted into one another, or the larger diametered tubes may be braided directly on the smaller ones as a core. The smallest or inner tube is generally braided on a solid removable core, which, of course, has been removed from the illustrated conduit.

The end portions of wire tubes 14, 16, and 18 are firmly secured together by means of solder indicated at 20, and each said end is secured by means, such as solder also designated 20, within the sleeve of a flanged terminal fitting such as that shown at 11 at the left and 11' at the right in FIG. 1.

For the purpose of rendering the conduit moisture-proof, and at the same time to provide a smooth, non-chafing inner surface on the conduit to protect insulated wire passing therethrough against damage, the assembled conduit member 10, made up of superposed tubes 14, 16, and 18, and, in the embodiment shown having terminal fittings 11, 11' connected thereto, is treated in a novel manner now to be described to provide therein a lining 28 and at the same time to provide thin layers 15 and 17, of the lining material, respectively, between adjacent layers of the metal tubes making up the wall of the conduit. A thin coating 19 of such compound is preferably also disposed upon the outer surface of metal tube 18. The layers 15, 17 and 19 are integrally connected to each other and to lining 28 through the porous braiding of the intervening braided metal tubes.

In addition to its non-chafing properties, the material of which lining 28 and layers 15, 17 and 19 is made should have good resistance to corona and should not contain volatiles for some uses. The lining material should be non-porous, flexible and resilient. When set, said material should retain these properties when subjected to a wide range of temperatures and exposed to grease, gasoline, and moisture. A suitable material should also be tough and have the ability to conform to the braided metal tubing and withstand continual bending stresses. Elastomers, such as those having a polyvinylchloride base and silicone rubbers have been found suitable. One such silicone rubber or "silastic" compound is that sold under the trade-name "Dow Silastic 132."

Another lining material which has been found suitable for use in flexible conduits for radio shielding aircraft engine ignition systems, for example, is a synthetic plastic material known in the trade as a "plastisol," i.e., a fluid dispersion of polyvinylchloride polymer in a plasticizer which may be converted by heat alone to an elastomeric vinyl compound. This material has a polyvinylchloride base with suitable plasticizers and a heat stabilizer. Suitable fillers may be used, if necessary, to vary the flow characteristics. A suitable composition consists of ten parts by weight of polyvinyl chloride, such as "Geon #121," four parts of Rohm and Haas "Paraplex C–50," two parts of "Paraplex C–60" (a polyester) and two parts of a heat stabilizer consisting of a mixture of Paraplex C–50 and dibasic lead phthalate in equal parts. This material is prepared for application at normal room temperature. The Geon #121 should be in the form of a fine powder, the plasticizers (Paraplex) are added in liquid form, and the heat stabilizing mixture is added in finely powdered, well-mixed form. The ingredients are then mixed thoroughly, preferably under vacuum.

The impregnating compound such as silicone rubber or plastisol is applied to the above described structure 10 (FIG. 1) in accordance with the novel method of the invention, one embodiment of which will now be described. Such method is conveniently carried out by use of the apparatus shown in FIGS. 4–9, inclusive.

Such mold, which is generally designated 24, is of the longitudinally divided type having a lower half 25 and an upper half 26 which when assembled have an interface 23' disposed longitudinally of the mold and along planes diametral of the two confronting semi-cylindrical cavity portions 27 and 29 in the respective mold halves. Such two cavity portions form a cylindrical cavity 23 having a main extent with a diameter slightly greater than that of the outer braided tube 18 of conduit 10. Conduit 10 is disposed in the mold cavity in extended condition (being held in that condition and sealed at its ends to the cavity of the mold by means to be described and generally designated 30 at the left (FIG. 7) and 31 at the right.

Figure 7:
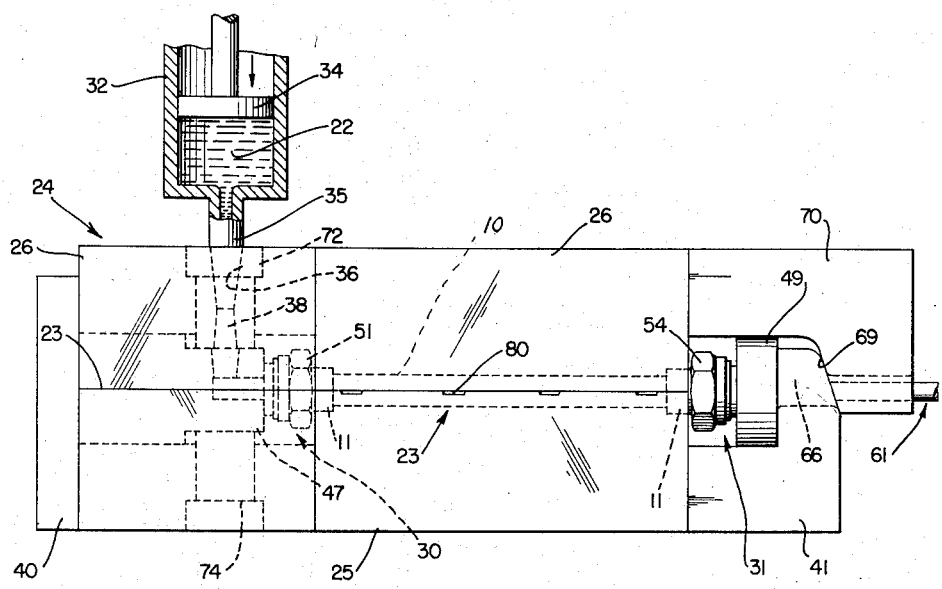
FIG. 7 is a view in elevation of the assembled mold having a conduit to be treated contained therein, a portion of a compound-supplying injection device being shown cooperating with the mold.

When the mold has been assembled as shown in FIG. 7, with conduit 10 therewithin, it is then impregnated by a compound 22, such as those described above, supplied by an injection cylinder shown generally at 32. Cylinder 32 has a piston 34 which is thrust downwardly by mechanism, not shown, to deliver plastic material 22 outwardly of cylinder 32 through nozzle 35. The outer end of the nozzle is tapered, and is received in a similarly tapered opening 36 which is located at one end (the left in FIGS. 4, 5, and 7) of the upper portion 26 of the mold above the conduit-receiving cavity portion 29 therein. The thus delivered plastic material 22 is forced inwardly to a throat 38 in mold part 26 and thence longitudinally of the central passage in conduit 10, from which it flows outwardly through the porous sidewalls of the conduit into contact with the wall of the mold cavity, thereby filling the interstices in the tubes 14, 16, and 18 and forming the layers 15, 17, and 19.

The construction of the means whereby the ends of the conduit 10, including terminal fittings 11 and 11', are positioned in the mold cavity and sealed to the walls thereof will be more readily apparent on consideration of FIGS. 4 and 5. As there shown, lower mold part 25 has an enlarged semi-cylindrical cavity 42 at the left therein coaxial of cavity portion 27, and a similar enlarged cavity 45 at the right end of such mold part. Upper mold part 26 is somewhat shorter than mold part 25, and is retained in position thereon by guide pins 12 receivable in holes 13 in the lower mold part. Upper mold part 26 has similar enlarged cavities 44 and 46 confronting cavities 42 and 45, respectively, in mold part 25. The enlarged cylindrical cavities thus provided at the ends of the conduit-receiving cavity 23 have diameters such that they freely receive the nuts 51 and 54 disposed on sleeve members 11 and 11', respectively, of the two terminal members of the conduit (FIG. 1). A block 47 is slidably mounted in the left enlarged cavity, and a cylindrical block 49 is slidably mounted in the right enlarged cavity. The slidable blocks 47 and 49 provide means whereby the ends of the conduit are suitably positioned within the mold cavity 23 and are sealed to the wall of such mold cavity. The conduit holding means includes an externally threaded nipple 50 disposed on the inner face of block 47 coaxial with the conduit-receiving cavity 23, and a similar nipple 52 disposed on the inner face of block 49. The outer ends of the conduit-receiving cavity 23 are provided with shallow counterbores which snugly receive, respectively, sleeve portions 11 and 11' of the two terminal fittings on the conduit. Mold part 25 is provided with left and right shallow counterbore portions 55 and 57, and mold part 26 is provided with shallow counterbore portions 56 and 59, such counterbore portions cooperating to form the aforesaid counterbores receiving the sleeve portions of the terminal fittings on the conduit.

The upper mold part 26 is provided with a sprue bushing 72 at its left hand end (FIGS. 4, 5, and 7) above block 47, the bushing having the above-mentioned bell mouth 36 and throat 38 therein. A plug 74, aligned with bushing 72, extends upwardly through mold part 25. The upper and lower inner surfaces of block 47 are flat, as shown at 75 and 76, respectively, and abut the inner ends of bushing 72 and plug 74, whereby the block 47 is retained from rotation about its axis within its enlarged cavity in the mold 24.

Block 47 has a vertical passage 77 therein aligned with the inner end of the throat in bushing 72, said passage communicating with a horizontal passage 79 extending to the right (FIGS. 4, 5, and 7) through nipple 50 into communication with the central passage in a conduit 10 held within mold cavity 23 by mounting means 30 and 31. In accordance with the invention, impregnating compound is first injected under pressure within a conduit 10 mounted in mold 24 so as completely to fill the central passage in the conduit and the interstices in the sidewall of the conduit, after which the excess compound is forced or ejected from the central passage in the treated conduit. During such first step, the central passage 65 in block 49 is closed by the nose 60 of mandrel 61, such mandrel being retracted to the position shown in FIG. 5 during the initial step of injecting plastic material into the conduit.

Because of the very substantial pressures developed internally of the conduit during injection of plastic material 22 by cylinder 32, it is desirable positively to back up blocks 47 and 49, thereby to prevent undesirable elongation of the conduit in the mold. Block 47 is backed up by a vertical flange member 40 affixed to the left hand end of the mold part 25 and overlying a portion of mold part 26 when a mold is assembled. Mold part 25 has a block 41 attached to the right hand end thereof, block 41 having two spaced upstanding ears 66 which form the outer terminus of the cavity 45. The central space 67 between the ears 66 provides a passage for the reception of mandrel 61. The outer generally vertical surface of each ear 66 is bevelled as shown at 68 to cooperate with similarly bevelled surfaces 69 on the overhanging end portion of a block 70 affixed to the right hand end of upper mold part 26. As will be apparent in FIGS. 5, 7 and 9, the assembled mold halves are thus accurately held against longitudinal movement with respect to each other and provide rigid abutments which prevent the moving apart of blocks 47 and 49.

The above mentioned mandrel 61 is shown most clearly in FIG. 8. Rearwardly of nose portion 60, the mandrel is of reduced diameter at 62, and rearwardly of portion 62 has a larger diameter, lining smoothing portion 63. The mandrel is reciprocated longitudinally of the cavity 23 in the mold by a hydraulic ram 64, generally shown in FIG. 9.

It will be assumed that the conduit has been assembled as shown in FIG. 1, and that the parts thereof are clean and dry. It will also be assumed that the upper mold part 26 has been removed from lower mold part 25, mandrel 61 has been retracted from block 49, and blocks 47 and 49 have been lifted from bottom mold part 25.

The conduit 10 is impregnated as follows: An untreated conduit 10 has its nut 51 of fitting 11 screwed home on threaded nipple 50, and nut 54 is screwed home on threaded nipple 52. The blocks 47 and 49, and conduit 10, now assembled as a unit, are lowered into place in the cavity in lower mold half 29 so that the conduit lies in mold cavity portion 27, the sleeve portions of the terminal fittings lie in the respective counterbores at the ends of the mold cavity, and the assembled nuts 51 and 54 and blocks 47 and 49 lie within enlarged cavity portions 42 and 44 of the lower mold-half. The upper mold-half 26 is then assembled upon the lower mold-half, and the mandrel 61 is advanced by ram 64 to the position shown in FIG. 5 wherein its nose portion 60 effectively blocks passage 65.

Impregnating material 22 may now be introduced into the mold by presenting injection cylinder 32 thereto, as indicated in FIG. 7, and then thrusting piston 34 thereof downwardly until material 22 has filled the central passage in the conduit and the interstices or voids in the porous side walls of the conduit and has formed the layers 15, 17, and 19 of such impregnating compound between the successive braided metal tubes and on the exterior of outer metal tube 18, respectively.

After the conduit has been filled and the walls thereof impregnated, the thrusting force remains on piston 34. Mandrel 61 is now thrust to the left so as to travel through the central passage in the impregnated conduit 31, as indicated in FIG. 9. The nose portion 60 of the mandrel functions somewhat as a piston, thrusting excess plastic material 22 axially through the conduit 21 and returning it through passage 79 and throat 38 into cylinder 32 against the thrusting force on piston 34. The diameter of nose portion 60 of the mandrel is such as to provide a layer 28 of the desired thickness on the interior of the conduit. The nose portion of the mandrel effects a preliminary smoothing of layer 28. Portion 63 of the mandrel further smoothes the lining layer and forces out through the conduit wall any plastic material in excess of that required to form layer 28.

After mandrel 61 has been fully advanced to the left, so that its nose lies beyond sleeve 11 of the left terminal fitting, ram 64 is operated to retract the mandrel to its starting position outwardly of block 49.

As a result of such operations the plastic material forming the layers 28, 15, 17, and 19 of the impregnated conduit is in effect double-worked, that is, the material is subjected initially to appreciable pressure when it is first injected into the conduit, and is again subjected to pressure when the excess plastic material is removed from the conduit. As a result, all voids and air bubbles are removed from the wall of the conduit and the various plastic layers thereof are strongly compacted and firmly bonded. To insure the removal of air from the mold cavity, air bleeding ducts are provided, spaced along the length of the conduit. In the mold shown there are four such ducts at each side of the mold cavity, the ducts being formed by shallow grooves 80 milled into the upper space of mold part 25. The resulting ducts are large enough to provide free egress of air but pass only small quantities of plastic material at each operation. Such discharged plastic material may be occasionally removed from the ducts in the mold when required.

The impregnated conduit 21 is then removed from the mold parts as follows: The mandrel 60 is preferably first pulled out of the conduit 21, after which blocks 47 and 49 with the attached impregnated conduit 21 are removed from mold part 26. Nut 51 is then unscrewed from nipple 50, and nut 54 is unscrewed from nipple 52 on block 49. The mold is then ready for the treatment of another conduit 10.

The thus impregnated conduit 21 is then transferred to a suitable oven and baked for a suitable time and at a suitable temperature to set and cure the impregnating compound. Ordinarily a temperature of 340–360° F. and a baking time of 25–30 minutes are satisfactory for setting and curing the plastisol, for example. The baked assembly is removed from the oven and allowed to cool to room temperature, after which it is cleaned to remove excess impregnating compound therefrom as required.

The present invention provides an improved moisture-proof radio shielding conduit having a smooth inner layer of plastic material of substantially uniform thickness, an improved simplified, reliable and effective method for fabricating such conduit, and a novel apparatus by which the method may be carried out. The novel method makes it possible to make such conduits with assurance as to the uniformity and high quality of the finished product and to effect such fabrication rapidly and at low cost with a minimum waste of materials. The apparatus of the invention is simple, rugged, and easily operated. Such apparatus produces impregnated conduits which are substantially uniform throughout their extents, and also from conduit to conduit. The pressure exerted upon the impregnating compound both during the initial, conduit-filling operation and also during the subsequent advance of the mandrel into the mold insures that the impregnating compound in the tube sidewalls and tube lining is dense and void-free. Further, use of such apparatus eliminates the necessity of any time-consuming operation of gravity draining excess compound from the impregnated conduit.

Although only single embodiments of the conduit, method, and apparatus of the invention have been illustrated in the accompanying drawings and described in the foregoing specification, it is to be expressly understood that the invention is not limited thereto. For example, the apparatus is applicable to making conduits having a variety of shapes; the contour of the mold cavity and the shape of the mandrel may be altered as required by the shape of the conduit to be treated. Various other changes may also be made, such as the specific materials, temperatures and the like suggested herein by way of example and in the design and arrangement of the parts illustrated without departing from the spirit and scope of the invention as the same will now be understood by those skilled in the art.

What is claimed is:

1. Apparatus for lining and impregnating the porous walls of a conduit having a longitudinal passage therein with a fluid compound, comprising a mold having a cavity receiving the conduit in extended condition, means for substantially sealing the ends of the conduit to the wall of the cavity, means in the mold forming a passage for introducing impregnating compound into the passage in the conduit, and a mandrel mounted to be reciprocable in the conduit passage and introducible into the latter after the conduit has been filled with compound to expel excess compound from the conduit and to shape the compound remaining in the conduit into a smooth lining.

2. Apparatus for lining and impregnating the porous walls of a conduit having sleeve-like laterally imperforate terminal fittings and a longitudinal passage therein with a sluggish compound, comprising a longitudinally divided mold having an elongated cavity receiving the conduit and the sleeves of the terminal fittings therein with the conduit in extended condition, the cavity lying at the interface of the mold parts, means in the mold forming a passage for introducing impregnating compound into the passage in the conduit, means in the mold for substantially sealing the sleeves on the terminal fittings of the conduit to the ends of the wall of the cavity, and a mandrel mounted to be reciprocable in the conduit passage and introducible into the latter after the conduit has been filled with compound to expel excess compound from the conduit and to shape the compound remaining in the conduit into a smooth lining.

3. Apparatus as defined in claim 2 for the impregnation of conduits having flanged terminal fittings wherein the sleeves of the terminal fittings are received within the outer ends of the mold cavity and the flanges on the fittings overlie the ends of the mold cavity.

4. Apparatus as defined in claim 3, comprising a block beyond each end of the mold cavity, the blocks being slidable toward and away from the respective ends of the cavity, and each block having an inwardly facing abutment surface thereon adapted to engage the outer face of the flange.

5. Apparatus as defined in claim 4 for treating in the manner recited conduits having outwardly facing nuts on the terminal fittings inwardly of the flanges on such fittings, wherein the mold has passages extending outwardly of and aligned with the ends of the mold cavity, said passages receiving the nuts on the respective terminal fittings.

6. Apparatus as defined in claim 5, comprising bosses on said blocks aligned with the ends of the mold cavity and threaded to receive the nuts of the terminal fittings thereon.

7. Apparatus for lining and impregnating the porous walls of a conduit having terminal fittings and a longitudinal passage therein with a sluggish compound, comprising block-like members in alignment with the conduit extended between them, a central passage in one of the members coaxial of the passage in the conduit, means including a feeding passage to introduce compound under pressure into the passage in the conduit, means selectively substantially to close the system composed of the members and the conduit except for said feeding passage, a central passage through the other of said members, and a mandrel introducible into the central passage in the conduit after the conduit has been filled with compound to expel excess compound from the conduit and to shape the compound remaining in the passage in the conduit into a smooth lining of substantially uniform thickness.

8. Apparatus for lining and impregnating the porous walls of a conduit having terminal fittings and a longitudinal passage therethrough with a sluggish compound, comprising block-like members sealingly connectable to the terminal fittings, means to hold the members in alignment with the conduit extended between them, central passages in the members coaxial of the passage in the conduit, means including a feeding passage in one of the members to introduce compound under pressure into the passage in the conduit, and a mandrel reciprocable in the central passage in the other of said members between a retracted position in which it closes the passage in said other member and a position in which it extends through the passage in the conduit.

9. Apparatus as defined in claim 8 wherein the means for holding the members is a mold having a cavity embracing the conduit, and comprising means for holding the terminal fittings in substantially sealing contact with the ends of the cavity.

References Cited in the file of this patent
UNITED STATES PATENTS

| | | |
|---|---|---|
| 1,649,139 | Sonen | Nov. 15, 1927 |
| 2,561,351 | Fentress | July 24, 1951 |
| 2,759,864 | Kuebler | Aug. 21, 1956 |